Sept. 18, 1945.  C. C. McCARTHY  2,385,095
AIRPLANE PILOT TRAINER
Filed April 30, 1943   7 Sheets-Sheet 1

Inventor:
Cornelius C. McCarthy
By: Louis A. Bisson,
Attorney.

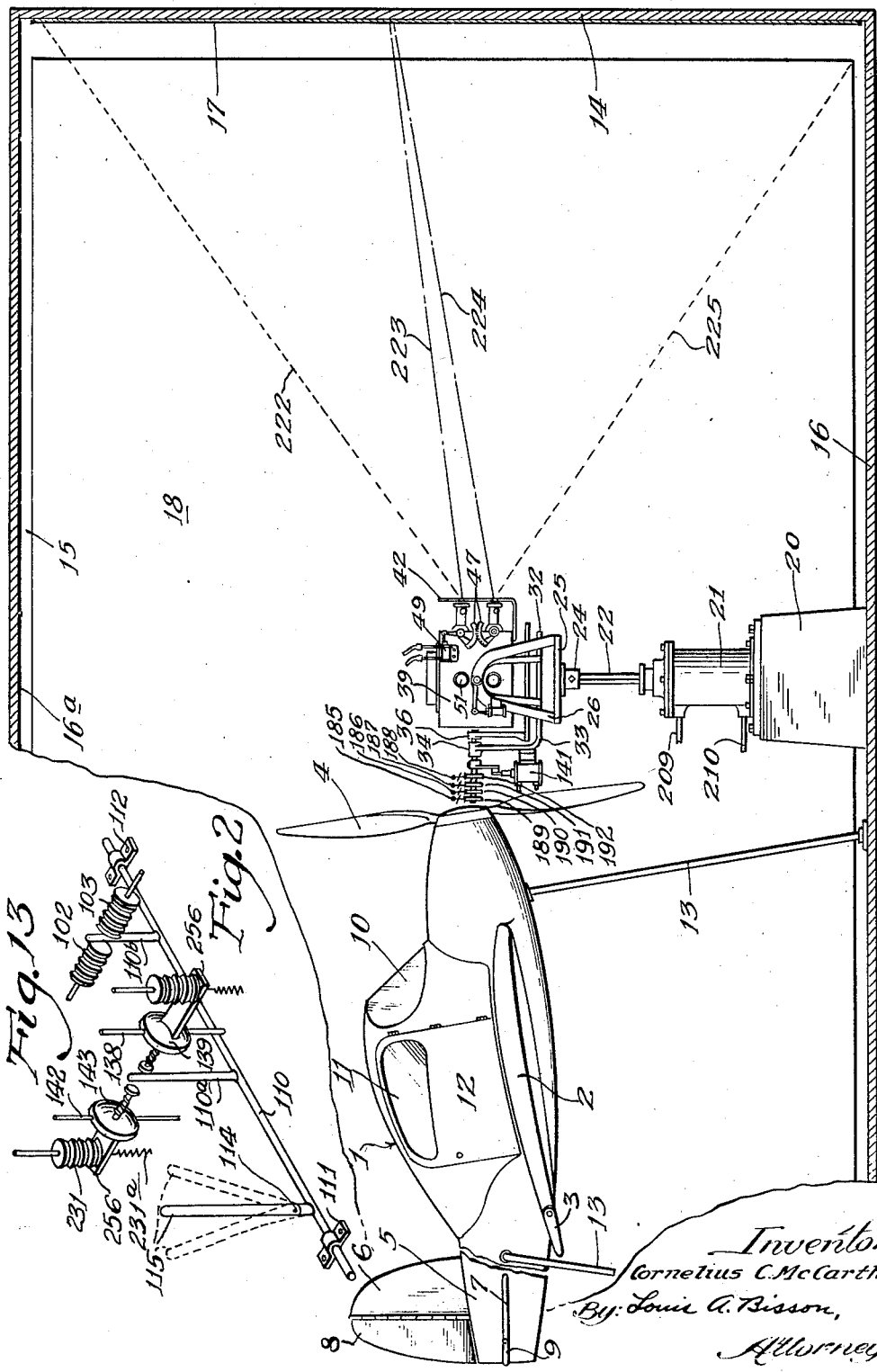

Sept. 18, 1945.   C. C. McCARTHY   2,385,095
AIRPLANE PILOT TRAINER
Filed April 30, 1943   7 Sheets-Sheet 3
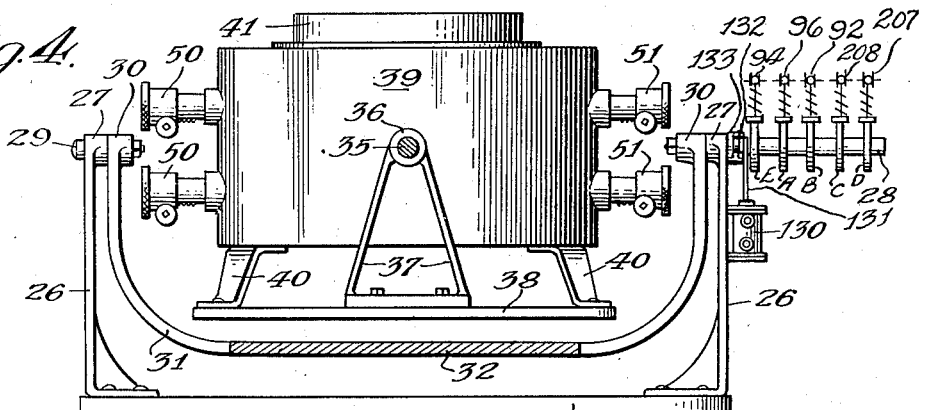
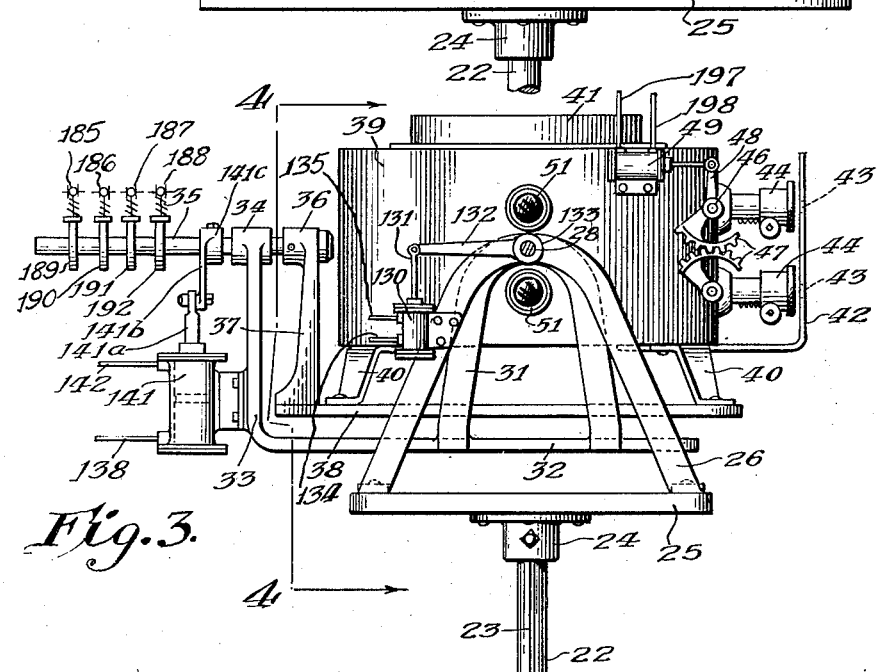
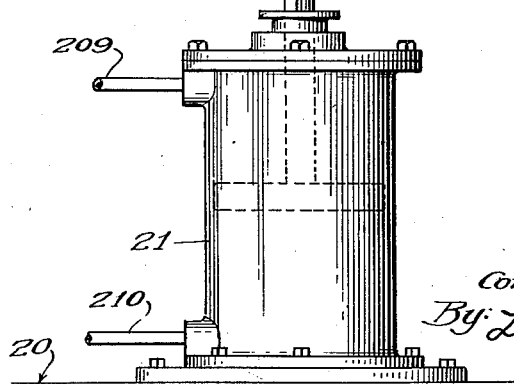
Inventor:
Cornelius C. McCarthy
By: Louis A. Bisson.
Attorney:

Inventor:
Cornelius C. McCarthy,
By: Louis A. Bisson,
Attorney.

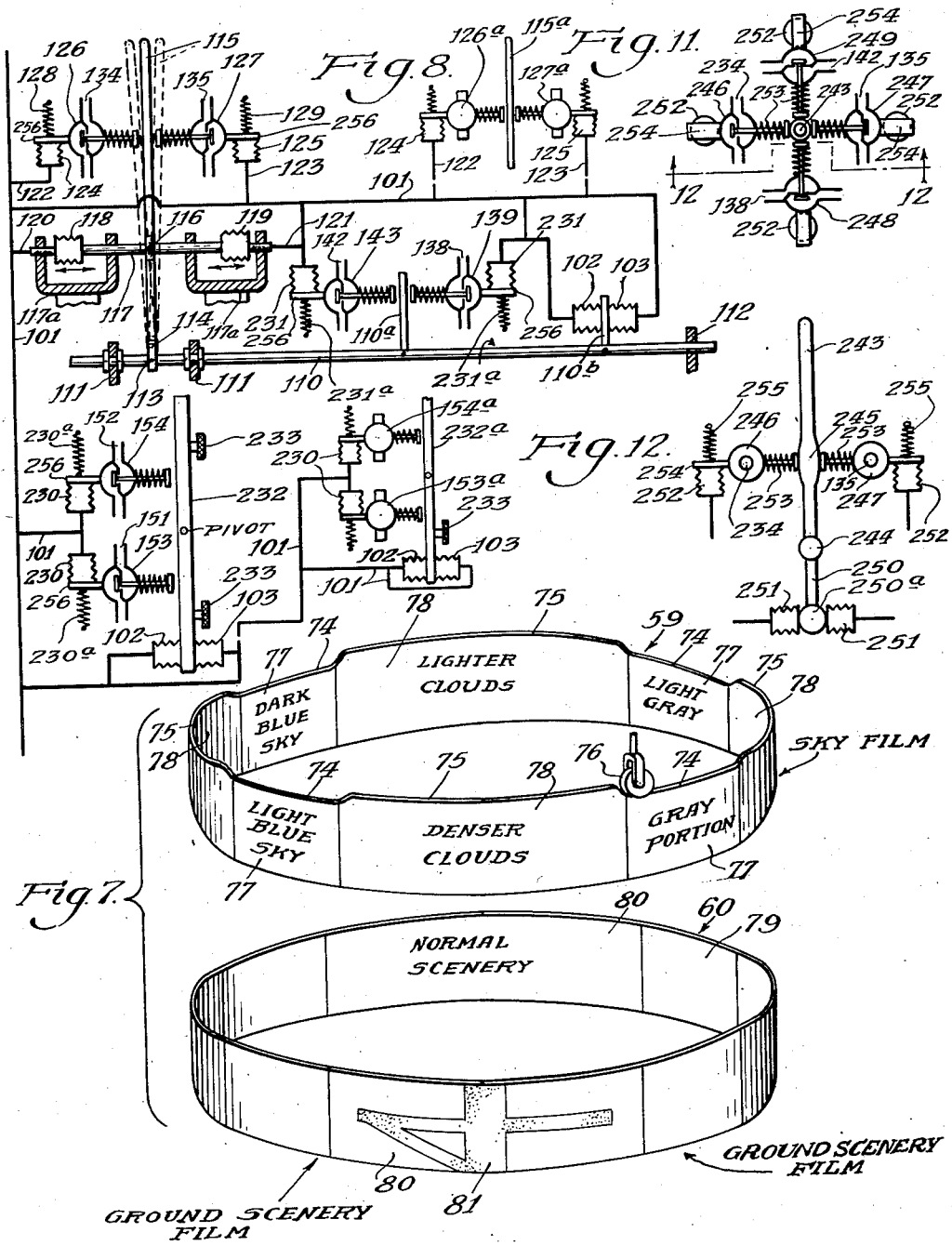

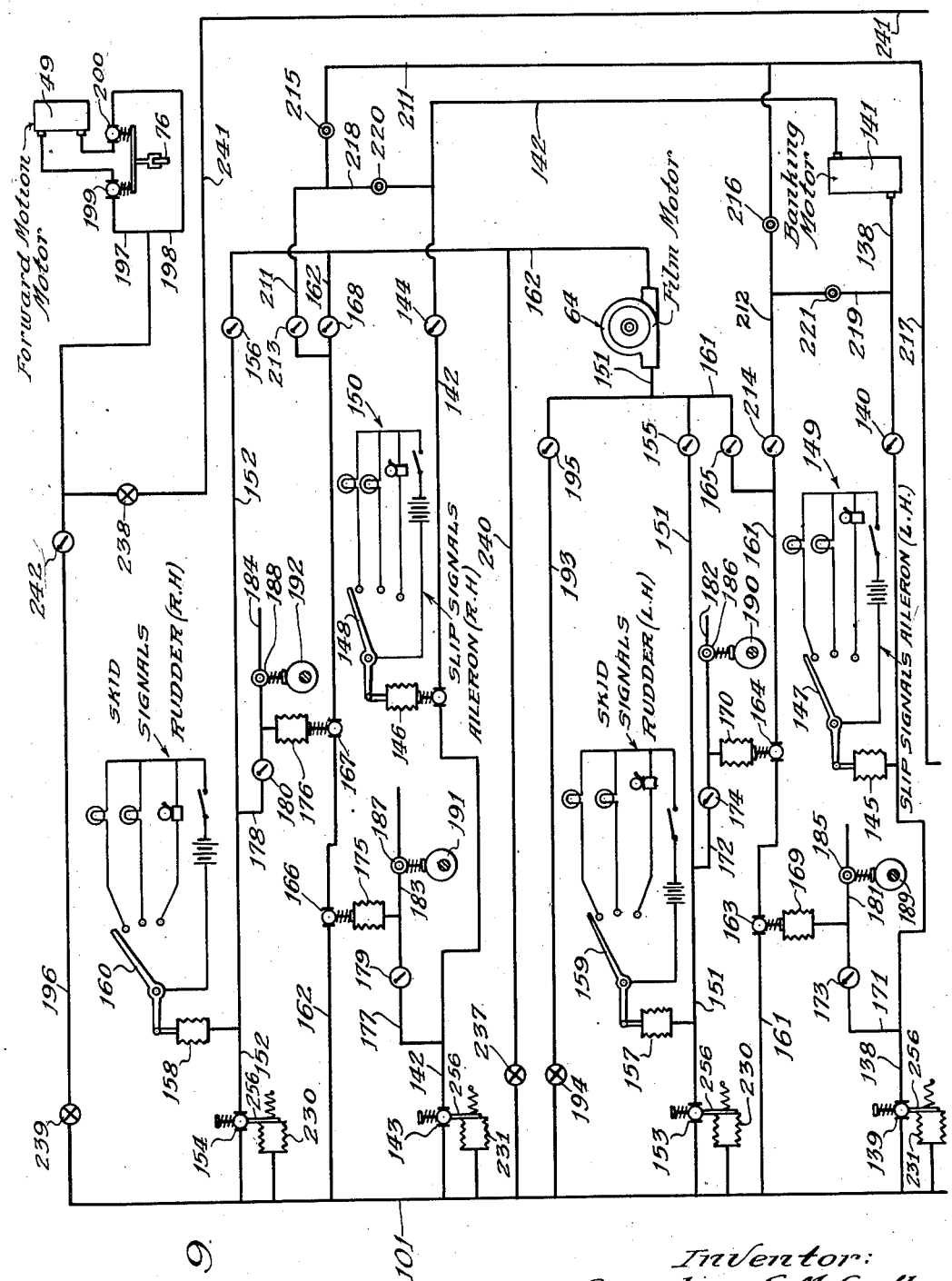

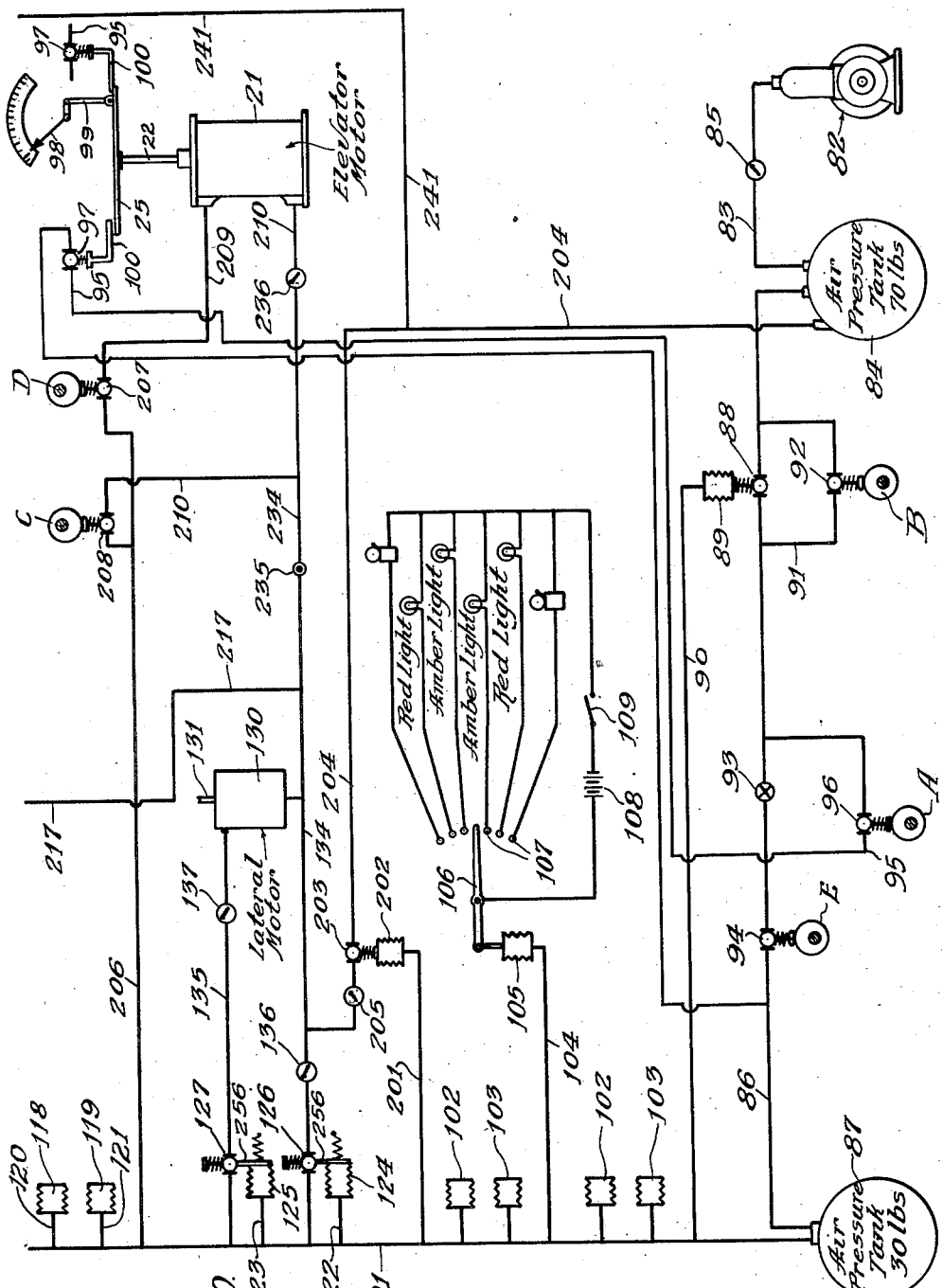

Patented Sept. 18, 1945

2,385,095

UNITED STATES PATENT OFFICE 2,385,095

AIRPLANE PILOT TRAINER

Cornelius C. McCarthy, Chicago, Ill.

Application April 30, 1943, Serial No. 485,179

3 Claims. (Cl. 35—12)

The present invention relates to a device for teaching how to fly airplanes, including the various maneuverings thereof, without involving the dangers attendant to when learning in a plane in actual flight.

Among the objects of the invention is to provide a novel device, as above generally indicated, which is at a "ground" locus, the term ground being used at this point as meaning any place not in flight, comprising a substantially stationary dummy designed to have the appearance of a plane and its usual parts, such as a cabin with forward and side windows, a stick, rudder pedals, and signals, etc., as in an actual flying airplane.

Another object of the invention is to provide relative to the dummy, as forwardly and laterally thereof, in suitably spaced relation, novel screen means, or the like, upon which images of sky, land, and otherwise, may be projected and viewed by the student with exactly the same effect as when in actual flight, the views on the screens being produced and moved in strict accordance with the movements of the controls, such as the stick, the rudder pedals, and the like, by the student.

A further object of the invention is to provide a novel view projecting means, which may, be located forwardly of the dummy airplane, as shown in Fig. 2, or at any other locus as might be desired and found convenient, for producing the images upon the screens.

The invention comprehends as a part thereof novel image positives, as films, or the like, for producing the projected views or images on the screens, these positives being carried by and operated by the projecting means. The projecting means also comprises sets of movable lens units for projecting and moving certain parts of the scenery consonant with the controls operated by the student, with such sets so located, as forwardly and laterally of the projecting means, as to correspond to the scenes to be depicted by them on the relative screens.

Also, the invention includes simple means for operating the projector and its parts, such as pneumatic means including air or gas pumps and motors, ducts, etc. While the device is shown by way of illustration with pneumatic means, it is to be understood that the invention may use some other agency of power, such as electricity in lieu of a compressed gas.

Other objects, advantages, capabilities, features, and the like are comprehended by the invention as will later appear, and as are inherently possessed by the invention.

Referring to the drawings:

Fig. 2 is a part side elevational view along a longitudinal vertical plane;

Fig. 3 is a side view of the projecting means and the lift therefor;

Fig. 4 is a part sectional view of the device shown in Fig. 3, and taken in a plane represented by line 4—4 in Fig. 3 of the drawings;

Fig. 7 is a perspective view of the endless films for projecting the sky and ground sceneries;

Fig. 8 is a part schematic and part perspective view of the controls in the cabin;

Figs. 9 and 10 are sections of a diagram showing the system and the mode of operation of the device;

Figs. 11 and 12 are respectively top plan and elevational views, somewhat diagrammatic, of an alternative form of control means; and, Fig. 13 is a part perspective view of a portion of the structure shown in a diagrammatic way in Fig. 8 of the drawings.

Figure 1:
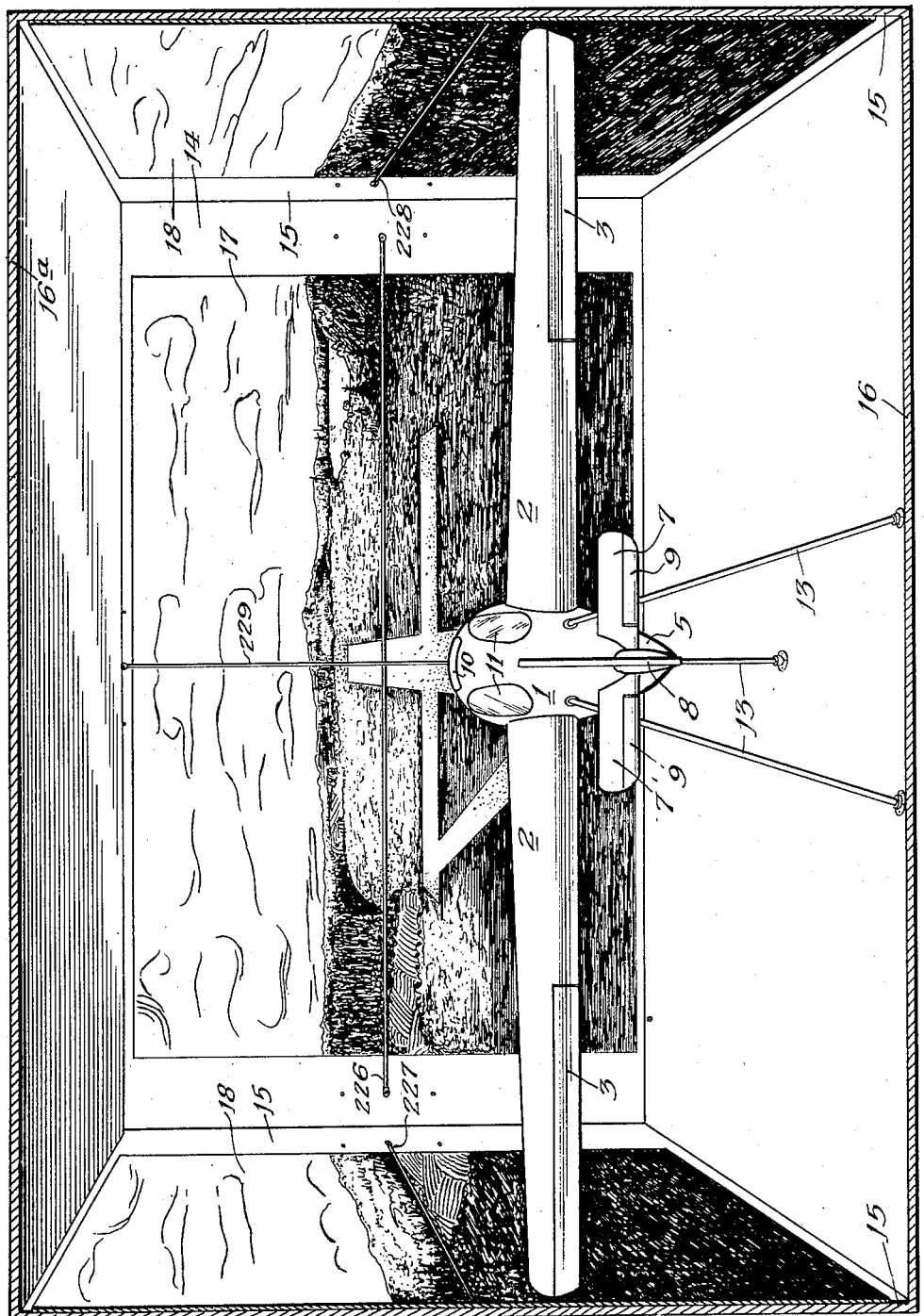
Fig. 1 is a rear view in elevation of the device, showing the chamber in section.

Referring more particularly to the drawings, the embodiment selected to illustrate the invention is shown as comprising a dummy airplane 1 provided with laterally located wings 2 having, if desired, movable ailerons 3, and, also, if desired, a propeller 4, although these are not essential. The plane may have a tail 5 or equivalent portion for supporting upwardly and laterally extending stabilizers 6 and 7 with their accompanying rudder 8 and elevators 9.

The body or cabin 1 of the dummy should have at least a forward window 10 and side windows 11 of which the latter may be in side doors 12, as desired. The dummy is supported at any suitable height as by supporting struts 13, or the like, as desired.

As shown the dummy is preferably located in a darkened chamber having a front wall 14, side walls 15, a bottom wall 16, a top wall 16a, and any suitable rear wall, not shown. The front and side walls may serve as screens upon which the images are cast or projected, and in the illustrative device, I have shown separate screens 17 and 18 respectively carried by the forward and side walls 14 and 15.

The projector shown has a suitable supporting base or pedestal 20 upon which is set a cylinder or elevator motor 21 in which operates a suitable piston, shown in dotted lines in Fig. 3, fixed to a piston rod 22 acting as the elevating or lift means for the projector. The rod 22 has a suitable key way 23 or the like for preventing angular movement about the axis of the rod 22. At the upper end of the rod 22 is secured a flange plate 24 upon which is seated and fixed a base plate or table 25 rigidly carrying spaced yokes 26 having at their crests shaft bearings 27 (see Figs. 3 and 4).

In these bearings are shafts 28 and 29 rotatably carrying bearings 30 of a second set of yokes 31 integral to or rigid with a plate or base 32, as shown in particular in Figs. 3 and 4. The plate 32 at an end thereof has an upstanding yoke 33 provided at its crest with a bearing 34 for a shaft 35. To the inner projecting end portion of the shaft 35 is carried and secured a hub 36 at the upper end or crest of a yoke 37 fixed at its base to a base plate or platform 38 upon which is supported and fixed a projector 39 by way of supporting feet 40. It will thus be apparent that the projector 39 is supported to have angular movement about the axis of the shaft 35 which is at right angles or at a normal to the axis of the shafts 28 and 29 (see Fig. 4). The projector 39 may have any suitable bonnet or chimney 41 at the top as shown.

At the front of the projector 39 is suitably adjustably connected a shield 42 the upward extending portion of which has suitable apertures or openings 43. Also, at the front of the projector is connected a pair of lens units 44 which are located rearwardly of the apertures 43. Each of the lens units 44 extends through the front wall portion of the projector (see Figs. 5 and 6) and has a ball and socket connection 45 therewith, and also has fixed thereto a horizontal shaft 46 at one end thereof, the other end of the shaft being secured to a gear sector 47.

There are two of these gear sectors 47 which mesh to coordinately move the lens units 44 toward or away from each other, as about the axes of the shafts 46. To the upper shaft 46 is preferably connected an arm 48 articulated to a suitable cylinder device 49, such as a forward motion motor. (See Fig. 9.) The projector 39 also has side lens units 50 and 51 which are in fixed relation to the projector 39 and are for projecting scenes on the side screens 18. The forward lens units 44 are for projecting scenes or images on the forward screen 17.

Within the shell of the projector 39 are located four upright shafts 52 having their lower ends in suitable bearings 53 fastened to the bottom 54 of the projector proper. On these shafts 52 are rotatably carried upper and lower reels or spools 55 and 56 having spaced guiding flanges 57 and 58 for two endless film-like positives 59 and 60 shown in perspective in Fig. 7.

These films are made to travel by the turning or rotating of all the drums or reels 55 and 56 each of which at its lower end has attached a gear 61 in mesh with a central and common driving gear 62 suitably connected to a speed reducing gear train 63 (see Fig. 6) driven by a suitable reversible type of air turbine 64, all supported upon the base plate 38. Suitable film tighteners may be used to take up slack in the films, and may comprise flanged rollers 65 on suitable pivot supports 66 which may be adjustable as by hand screws 67.

Suitably supported from the top of the projector 39 is a lamp housing 68 provided with light ray channels 69 leading to the lens units 50, 51 and 44. Any suitable cap or cover 70 may be spacedly located in the bonnet 41. The lamps 71 are centrally located in the housing 68 to afford direct passage of light rays along the channels 69 to the lens units, and are suitably supported as by way of brackets 72 secured to the housing 68 as shown more fully in Figs. 5 and 6. The films 59 and 60 pass by the openings of the channels 69 and inwardly of the lens units, or in other words, between the lens units and the channels 69. The lamps are suitably connected to electrical wires or a cable 73, as shown in Fig. 6.

Referring to Fig. 7, the upper edge of the upper film 59 is preferably formed with cam portions or segments serving as depressions 74 and rises 75 at quarter positions of the circular extent of the film or positive 59. A roller 76 is adapted to ride on the upper edge of the positive 59 (see Fig. 7) and when it rides on the rises and depressions it alternates in motion to control the operation of the forward motion motor 49 (see Fig. 9).

The upper film 59 is preferably divided into eight segments of which there are four short segments 77 and four longer segments 78 alternating therewith and arranged, in each group, about a quarter around the circle. The longer segments 78 depict usual sky scenery, such as clouds and the like, and the shorter segments 77 are usually similar to a blank sky of any desired shade, but the effects produced in the various segments blend into each other imperceptibly, so that there is no noticeable demarcation between adjoining segments.

The lower film 60 also has like short and long segments 79 and 80 respectively and without any camming feature. This entire film depicts ground scenery, the four shorter segments 79 having no particular distinguishing scenic marks, and the longer segments 80 depicting predetermined or chosen forms of ground scenery, with one of the larger segments showing a representation of a runway, such as generally designated by the reference character 81 in Fig. 7.

Referring to Figs. 9 and 10 showing in diagrammatic form the layout of the controls and the medium of operation, the system comprises tubes or ducts to conduct operating fluid, such as air. The fluid under pressure is supplied from a suitable compressor 82 having a discharge line 83 leading to an air storage tank 84, the line 83 having a suitable check valve 85. By way of example the air pressure in tank 84 may be about seventy pounds per square inch.

From the tank 84 runs a duct 86 to a second air storage tank 87 where the air pressure may be normally maintained at a suitable lower pressure, such as thirty pounds per square inch. In the line 86 is provided an automatically operated pressure regulating valve 88 which may be of the pressure reducing type. It is operated by a bellows 89 connected to the valve 88 and having communication by way of a duct 90 leading to the tank 87.

About the regulating valve 88 is a by-pass 91 having a valve 92 operable by a cam B. See also Fig. 4. The valve 92 is for increasing the pressure in tank 87 above the normally maintained pressure, as above referred to, when it is desired to effect certain operations of the device more fully later described.

Also, in the line 86 are provided a manually operated throttle valve 93 and a cam operated valve 94 in series with the valve 93 and operable by a lateral cam E. See also Fig. 4. Also, in shunt with the valves 93 and 94 is a by-pass duct 95 in which are connected a valve 96 operable by a lateral cam A (see also Fig. 4), and a valve 97 (see upper right-hand portion of Fig. 10). The valve 97 is normally in closed condition with the platform or base plate 25 in full raised position which is the position for indicating zero altitude as shown by indicator 98 connected by a link 99 to the base plate 25.

It will be noted that the valve 97 has a finger 100 (see Fig. 10) which is contacted by and held up by the plate 25 only when the plate 25 is in uppermost position. When the plate 25 has moved down slightly at which time the valve 97 is open, further downward movement of the plate 25 leaves the finger 100 free and the valve 97 remains open for all positions of the plate 25 therebelow, until the plate 25 rises to its uppermost position and contacts the finger 100 to then close the valve 97.

The valve 96 is operable by a lateral cam A (see also Fig. 4).

From the tank 87 runs a main duct 101 which leads to all sensitivity and back pressure pneumatic motors 102 and 103 respectively, which in the illustrative embodiment are shown as of bellows form, and which are connected to the duct 101 at suitable points and in any desired and necessary number, a few only being shown and designated 102 and 103 merely by way of illustration or example.

To the line 101 is connected a duct 104 leading to a pneumatic motor 105 for operating an electrical switch 106 operable over a series of contacts 107. These contacts are in electrical circuits including a battery or other energy source 108, the circuit having any suitable circuit making and breaking means 109, when desired to note the signals. In operation and with the normal pressure in the tank 87 the switch 106 will be in mid-position and not in contact with any of the switch contacts 107. When the pressure changes, either by increasing or decreasing according to tendency to dive or to stall respectively, the switch will successively contact the contacts 107 to close the circuits first to the amber light, then to the red light, and then to the bell, at either side of the signal assembly shown.

Referring to Fig. 8 showing diagrammatically the manual and pedal controls, there is a longitudinal bar 110 capable of angular movement only and prevented from longitudinal movement in suitable supports 111 and 112 at the ends of the bar. Pivotally connected by way of a cross shaft 113 extending through the bar 110 is a yoke 114 having a rigid arm 115 located for manual actuation by the student.

The arm or stick 115 has a pivotal connection 116 with a longitudinally movable shaft 117. The ends of the shaft 117 are located opposite bellows 118 and 119 connected respectively by way of ducts 120 and 121. These bellows 118 and 119 are similar to or correspond to bellows 102 and 103 shown in Fig. 10, and the duct segments 120 and 121 shown in Fig. 8 also correspond to ducts 120 and 121 shown in Fig. 10. The shaft 117 is slidably supported in saddles 117a suitably pivoted about the axis of the shaft 110 so as to swing laterally when the stick 115 is moved laterally about the axis of the shaft 110, as later described.

The stick 115 extends up between the valves 126 and 127 (see Fig. 8) so that when the stick 115 is moved forwardly or rearwardly, as shown by the dotted line positions of the stick 115, the valves 126 and 127 are accordingly operated to control action of the air through the ducts 134 and 135 which are connected to the motor 130, the operation of which is later more fully explained.

From pipe 101 run pipes or ducts 122 and 123 leading to sensitivity bellows 124 and 125 which act, depending on the pressure in the line 101, to control the movement of air valves 126 and 127 relatively to the pivot 116 of the arm or stick 115 and the shaft or rod 117. Suitable springs 128 and 129 may be used to move the valves 126 and 127 closer to the pivot 116 when the bellows 124 and 125 contract.

The feature just described constitutes the elevator control and operates the lateral motor 130 which angularly moves the projector generally about the axis of the pivots or trunnions 28. Referring to Fig. 3 the lateral motor 130 is connected to the shaft 28 by way of a rod or link 131, lever or arm 132, and the hub 133 forming a part of the lever 132 and being suitably made fast to the shaft 28. Suitable air lines 134 and 135 are connected to the lateral motor 130 and to the main supply line 101 by way of valves 126 and 127. It is desirable to include check valves 136 and 137 in the respective lines 134 and 135 as shown in Fig. 10.

From main line 101 (see Fig. 9) run lines 138 and 142 to a banking motor 141, and having control valves 139 and 143 and check valves 140 and 144. Valves 139 and 143 are operated by a lateral movement of the stick 115 (as shown in Fig. 13). Referring to Fig. 8 and Fig. 13, the shaft 110 has a stick 110a which swings about the axis of the shaft 110 and in a plane at right angles to the axis of said shaft 110. The stick 110a when swung about the axis of the shaft or bar 110, directly operates the valves 139 and 143 (see Fig. 13 in particular) by moving the valve stems thereof. The showing in Fig. 8 is schematic and diagrammatic and the positions of the valves 139 and 143 are to be understood to be in a plane at right angles to the shaft 110. This is better shown in Fig. 13.

The rocking of the stick 115 forwardly and rearwardly about the pivot or shaft 114 (see Fig. 8) to the dotted line positions shown thereof is for the purpose of giving the effect of a glide or climb. The rocking of the stick 115 laterally and about the axis of the shaft 110 (see particularly Fig. 13) to the dotted line positions thereof as shown in Fig. 13 is for the purpose of giving the effect of banking, and, therefore, the shaft 110 and the stick 110a are moved to operate the valves 139 and 143 by way of their stems to produce the effect of banking.

Also on shaft 110 is fixed a stick 110b which when swung about the axis of the shaft 110 (see Fig. 13 in particular) and in a plane at right angles to the shaft 110 operates the sensitivity bellows 102 and 103 as better shown in Fig. 13.

All valves 126, 127, 139, 143, 153 and 154 herein described as moved bodily by the bellows 124, 125, 231, 231, 230 and 230, as shown in Fig. 8, have web parts 256 rigid with the valve bodies and against which the bellows mentioned act as herein described. Also connected to these web parts 256 are springs 128, 129, 231a, 231a, 230a and 230a respectively to bodily return the valves as the respective bellows contract, as herein described.

The line 138 runs through a check valve 140 to a banking motor 141 for controlling the simulated tilting or banking to the left about the longitudinal axis of the plane. Also, connected to the main line 101 runs another line 142 (similar to line 138) having a control valve 143 of the same nature as valve 139 described above, and runs through a check valve 144, which runs to the banking motor 141 for the simulated right hand banking about the longitudinal axis of the plane.

Referring to Fig. 3 the banking motor 141 is connected to the shaft 35 by way of a piston rod 141a pivotally connected to a crank arm 141b having a hub 141c fixed to the shaft 35.

Suitable signal means are preferably included to indicate side slip in either direction and the degree of slippage. Such means include bellows 145 and 146 respectively connected to lines 138 and 142 as shown in Fig. 9. These bellows operate through suitable switch means 147 and 148 for progressively operating signal means 149 and 150 which may include visual and audible signals as desired and as shown, and similar to the signal system shown in Fig. 10. As shown in Fig. 9 these signal means are identified by legends Slip signals aileron (L. H.) and Slip signals aileron (R. H.), respectively.

For the purpose of operating the rudder means to give the effect of left and right turning about a vertical axis of the plane, from main line 101 run lines 151 and 152 by way of control valves 153 and 154 and check valves 155 and 156, also in lines 151 and 152 respectively, to the film motor 64. These lines also operate signal means having bellows 157 and 158 connected to the lines 151 and 152 and designed to operate signals in succession by way of suitable switch arms 159 and 160 similar to the signal means 149 and 150 in Fig. 9 and described above. These signal devices are identified by the legends Skid signals rudder (L. H.) and Skid signals rudder (R. H.), respectively.

Also running from the main air line 101 are ducts or lines 161 and 162 to the film motor by way of bellows controlled valves 163 and 164 and check valve 165, and bellows controlled valves 166 and 167 and check valve 168, respectively. Valves 163 and 164 are connected to and operated by bellows 169 and 170 in communication with the lines 171 and 172 connected respectively to lines 138 and 151, and having check valves 173 and 174 respectively; and valves 166 and 167 are connected to and operated by bellows 175 and 176 in communication with the lines 177 and 178 connected respectively to lines 142 and 152, and having check valves 179 and 180 respectively. Connected to lines 171 and 172, and lines 177 and 178, are bleeder lines 181, 182, 183 and 184 respectively having bleeder valves 185, 186, 187 and 188 controllable by suitable cams 189, 190, 191 and 192 shown in Fig. 3.

For the purpose of simulating the drift of a plane, particularly in a single engine plane, a line 193 is connected to the main line 101 and has a valve 194 which may be operated manually when desired to cause the plane apparently to turn slowly to one side, as to the left when the tendency to drift is to the left, depending upon the direction of rotation of the engine or motor. The line 193 also has a check valve 195 and it is connected to the film motor 64, as shown in Fig. 9.

Also from line 101 runs line 196 to the forward motion motor 49, this line having a pair of pipe sections 197 and 198 in which are valves 199 and 200 operable by the roller 76 (see Fig. 7) so that when the roller 76 rides on the rises 75 valve 199 closes and valve 200 opens so that the motor 49 causes the effect of forward motion of the plane, the section 198 being open to one side of the motor 49, and when the roller 76 rides on the depressions 74 valve 199 opens and valve 200 closes so that the motor 49 reverses and resets units 44 with no perceptible movement of the scenery due to the fact that the projectors 44 are at the time in line with the segments 77 and 78 of the films which have no distinguishable scenery, the section 197 being open to the other side of the motor 49. The effect of forward motion is essential in the practice of take-offs and landings. The forward motion effect is interrupted only for the purpose of resetting the films to the starting point.

For the purpose of producing the effect of a stall a line 201 (see Fig. 10) is in communication with main line 101 and a bellows 202 operatively connected to a valve 203 in a line 204 connected by way of a check valve 205 to line 134 and to the high pressure tank 84 whereby air from the latter, which is at greater pressure than in the line 101, will pass by way of the duct 204, valve 203, check valve 205, duct 134 to the motor 130 to swing the plate 32 and projector 39 about the axis of the shafts 28 and 29.

For showing the effect of a climb or glide a line 206 is connected to the main line 101 and leads to two valves 207 and 208 respectively operated by cams D and C operated by motor 130 (see Fig. 10) by way of link 131 and arm 132 connected to the cam shaft 28, as shown in Figs. 3 and 4, these valves being respectively in lines 209 and 210 running to the opposite sides of the elevator motor 21. The level of the horizon changes when either valve 207 or 208 is operated.

To show the effect of the tendency to nose down in a turn (see Fig. 9) lines 211 and 212 are connected by way of check valves 213 and 214 respectively to lines 162 and 161 and both running through small orifice means 215 and 216 to a line 217 running to lateral motor 130 (see Fig. 10). From lines 211 and 212 run lines 218 and 219 (see Fig. 19) to lines 142 and 138 running to motor 141, the lines 218 and 219 having small orifice means 220 and 221 similar to means 215 and 216. The purpose of these circuits is to produce the effect of over-banking. The well-known tendencies for an airplane to overbank and nose down in a turn must be counteracted by the student.

Referring to Fig. 2, the upper lens unit 44 will normally project a view with an included angle between lines 222 and 223 as for a sky scene, and the lower lens unit 44 will normally project a view with an included angle between lines 224 and 225, as for a ground or like scenery. The two projected images meet at an apparent horizon.

Referring to Fig. 1, the front and side walls 14 and 15 may be provided with one or more horizontal strips 226, 227 and 228 and with one or more vertical strips 229 of suitably stiff or rigid material so that they will remain normally straight and not sag. These strips may be of other material tensioned or held taut between suitable securing or anchoring elements at the ends thereof to maintain them straight. As shown they are placed at medial positions but they may be adjusted to different loci as desired, or even removed entirely for certain purposes, such as in advanced training.

In Fig. 8 are shown in connection with pipe or ducts 101 at different stations suitable back pressure bellows 230 and 231 of the same type and corresponding in purpose to bellows 124 and 125. These are connected to the line 101 at suitable points.

Any number of sets of controls may be used, as, for example, an extra set which may be operated by the instructor when instructing a student. Such one or more sets are partly shown in Fig. 8 wherein is shown another control stick 115a which may be connected to the sliding bar 117, which may be longer than shown in Fig. 8, and to the rocking shaft 110 in the same way as the stick 115. Also the stick 115a will control valves, such as 126a and 127a, corresponding to valves 126 and 127. The extra controls will also have an additional pedal bar 232a, such as is partly shown in Fig. 8 for operating valves 153a and 154a, corresponding to valves 153 and 154. In this way dual or multiple control may be effected when teaching the student.

Referring to the alternative form shown in Figs. 11 and 12 the control is of a more universal nature and comprises a stick 243 having universal joint 244 or similar pivoting means and a valve operating part 245 adapted to act against the stems of the valves 246, 247, 248 and 249. The lower end of the stick has an extension 250 having a ball or the like 250a operative against a group of four bellows 251. The valves referred to above are movable nearer or farther from the universal or pivot point 244 by way of a group of four bellows 252 which correspond to the bellows 124, 125, 231 and 231 shown in Fig. 8. The stems of the valve referred to carry springs 253 which normally operate to return the valves to closed position when the stick is moved in the direction for permitting closing of the valves.

The valves mentioned have webs 254 acting as bases for the bellows 252 to act against and thus move the valves bodily. To these bases are connected springs 255 acting to move the valves in an opposite direction from the movement thereof by the bellows 252.

The valves 153, 154, 164 and 167 are operated by pivotal rudder bar 232 (see Fig. 8) to which may be attached suitable pedals 233, the bar 232 having a portion in position to be acted upon by back pressure bellows, such as bellows 102 and 103.

In operation any one of several controls may be effected either independently or combined dependent on the effect desired. In some cases to obtain the proper result it is necessary to coordinate two or more of the controls the same as would occur in actual flight.

At the start all the controls are properly in neutral positions. The student will be instructed to observe that the controls, such as the stick 115 and the rudder bar 232 can be moved freely against the valves 126 or 127, and 153 or 154 without producing any movement of the images on the screens (see Fig. 1). The first and natural operation is to effect take-off. The throttle valve 93 is first opened smoothly to admit air to tank 87 by way of valve 94 which is being held open by the cam E, and to in turn supply air to the main line 101 and the lines connected thereto. The pressure in tank 87 builds up to the desired or predetermined pressure, such as 30 lbs. per square inch, as controlled by pressure regulating valve 88 described above.

The student will now observe that the controls, such as stick 115 and rudder bar 232, against the valves 126, 127 and 153, 154, and the bellows 118, 119, and 102, 103 do not move as freely as before by reason of the back pressure bellows 102 and 103, 118 and 119 (see Fig. 8) opposing such motion. He will also observe apparent forward motion along the runway which is caused by the forward motion motor 49 oppositely tilting the projector lens units 44 whereby the effect on the forward screen is a downward movement of the ground image or scenery and an upward movement of the sky image. The visual effect on the student is forward movement. When he opened the throttle the desired effect produced was that of speeding up the engine whereby the above described apparent forward movement resulted.

The next effect to be produced is that of actual take-off. This is produced by easing the stick 115 back, as in actual practice, and this effects tilting of the plate or platform 32 by way of the lever 132 and the air motor 130 about the axes of the shafts 28 and 29, see Figs. 3 and 4, whereby the projector 39 is bodily moved to lower the forward part thereof whereby both the sky and ground images move downwardly and produce the effect on the student of being in the altitude for climbing. At the same time cam D (see Fig. 10) opens valve 207 to line 209 leading to the elevator motor 21 to cause the base plate or platform 25 to descend and thus also cause the forward images to descend and accordingly give the effect of rising or climbing. The altitude indicator 98 will at the same time move to show the increase in altitude.

When the indicator shows the particular altitude to be reached then the student moves the stick 115 forward to maintain level flight. At the start of gaining altitude, that is, when platform 25 has started to descend, it leaves the finger 100 of the valve 97 so that it opens the latter valve. This valve is (see Fig. 10) in a by-pass line 95 in series with the valve 96 which is operated by the cam A. Even though this valve 97 is being opened at that time there is no effect produced because valve 96 is still closed due to the lobe of the cam A being still in non-opening position.

The next step is to produce a gliding effect. For this purpose the student closes the throttle valve 93 and moves the stick 115 forwardly to the position for obtaining the desired gliding angle. In so moving the stick 115 it opens valve 127 to the air motor 130 thus tilting the projector 39 with its forward part upwardly. At the same time the cam A opens valve 96 which admits air through the already open valve 97 to the tank 87 to maintain the normal air pressure therein.

When the gliding is at a correct angle, the throttle valve 96, operated by cam A, is maintained sufficiently open to continue the normal air pressure in tank 87. The valve 97 remains open because of having altitude. At that time valve 93 is closed and valve 94 is open at all times except when the plane is tilted up at a too steep angle, which is later described.

When the glide angle is chosen incorrectly, as too steep, then cam B opens valve 92 to by-pass the pressure regulating valve 88 for the purpose of permitting passage of air at a higher than normal pressure to the tank 87. That causes an increase of pressure in the line 101 and on all back pressure bellows 103, 119 and 103, and also on all sensitivity bellows 102, 124, 125, 230 and 231. The student observes that the controls, such as the stick and pedals, require more energy to operate them.

It is to be understood that the student is nearly constantly trying out the stick and pedals to observe their degree of freedom of movement, and when he finds that they do not have such freedom he then is aware of the fact that the angle of glide is too much. He may also observe the same condition, that is, a too steep glide, from the greater sensitivity of the controls.

When the glide angle is chosen incorrectly, as too shallow, then the cam A opens the valve 96 insufficiently to maintain normal pressure in the tank 87. That causes a lower pressure in the line 101 and on all sensitivity and back pressure bellows. In this case the student observes that the operation of the stick and pedals is too easy or "mushy." He also observes that the controls are less sensitive than normally. In both instances of a too steep glide or a too shallow glide he will also obtain similar indications visually from the screen. However, this visual indication is not essential, and the sensitivity indications or the feel of the controls is the most reliable and dependable.

When gliding at a too steep angle or diving the bellows 105 will expand and move the switch lever 106 against successive contacts 107 to effect warning signals, which can be lights and bells or the like, in the lower set of signals shown in Fig. 10.

To show the effect of stalling which is caused by a losing of flying speed when the student eases back the stick and causes the plane to aassume a too steep climbing angle, cam A closes valve 96 and cam E closes valve 94 which shut off the air supply to tank 87 with a resultant drop in the line 101 and connecting lines.

Bellows 202 will contract and open valve 203 to admit air from tank 84 by way of line 204 through the check valve 205 to line 134 leading to lateral motor 130. This motor suddenly tilts the platform 38 to angularly swing the projector 39 about the axis of the shaft 28 and thus produces a sudden rise of the sky and ground images on the screen, which in other words, gives the visual effect of a sudden fall.

The drop in pressure in lines 101 and 104 causes the bellows 105 to contract and to move the switch 106 upwardly as seen in Fig. 10, over contacts to successively operate stall warning signals, in the upper group as shown in Fig. 10.

At the time of falling the lateral motor 130 also operates cams E and A which open valves 94 and 96 to permit flow of air to tank 87 and to restore the normal pressure therein. The student will observe the changes of back pressure and sensitivity of the controls during this operation. This shows the usual fall and recovery following a stall. Then the device is in condition for further maneuvering.

Reverting to the description above of gliding, there is a tendency when gliding for the angle of glide to increase. This is counteracted in a plane by the pilot's maintaining the necessary amount of back pressure on the stick during the gliding. For the student to learn how to maintain a correct gliding angle, the training means is provided with a duct 234 connected with ducts 210 and 217 in which duct 234 is provided a small passage or orifice 235, such as an aperture in a diaphragm in the duct 234 or similar means, which orifice is for the purpose of bleeding air to the lateral motor 130 and thus cause a tilting of the projector to give the effect of an increase in the gliding angle whenever the plane is in a gliding position. It is necessary for the student to correct this condition by maintaining the proper amount of manual back pressure on the stick.

Assuming proper gliding for landing and the plane reaches the runway with little altitude left, the pilot still holdling the stick, will then move the stick back to level the machine and finally nose it up as the remaining altitude is lost, that is, the plane settles. In the trainer the student similarly holds the stick and moves it back. The lateral motor 130 acts to tilt the projector 39 to give the view on the forward screen of moving forward, leveling and nosing up. At the same time the lateral motor 130 operates cams E and A to shut off valves 94 and 96 shutting off the air supply to tank 87. This causes the controls to lose their sensitivity and back pressure. The lack of pressure in tank 87 and the line 101 and the line 196 causes the forward motion motor 49 to slow down and stop. In the line 210, as it enters the elevator motor 21, is a check valve 236 which acts to maintain pressure under the piston in the elevator motor 21 when the pressure in the tank 87 and lines 101-206 drops.

For the purpose of teaching the student a correct turn, that is, a bank turn, it is necessary to teach him how to properly coordinate the controls.

With the trainer in condition to show flying, the student, to effect a left turn, by way of illustration, will press the stick 115 to the left to effect opening of valve 139. At the same time he presses the left rudder pedal 233 to open valves 153.

When valve 139 is opened air is admitted through line 138 and check valve 140 to banking motor 141. This motor causes platform 38 and projector 39 to tilt about the axis of the shaft 35 (see Figs. 3 and 9). This effects a tilting of the views on the forward and side screens to give the impression of banking to the left. The student holds the stick 115 in the same position until the bank increases to the desired angle for the radius of turn to be made. Also air is supplied through line 171, check valve 173 to bellows 169, later described.

Figure 5:
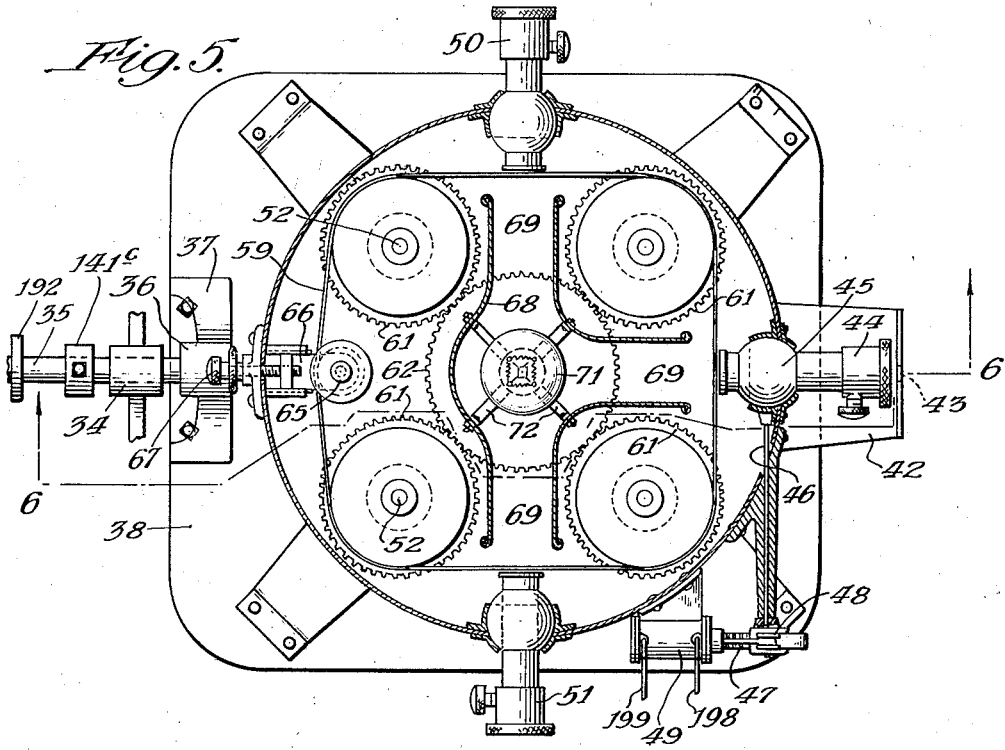
Fig. 5 is a horizontal sectional and part plan view taken in a plane represented by line 5—5 in Fig. 6 of the drawings.
Figure 6:
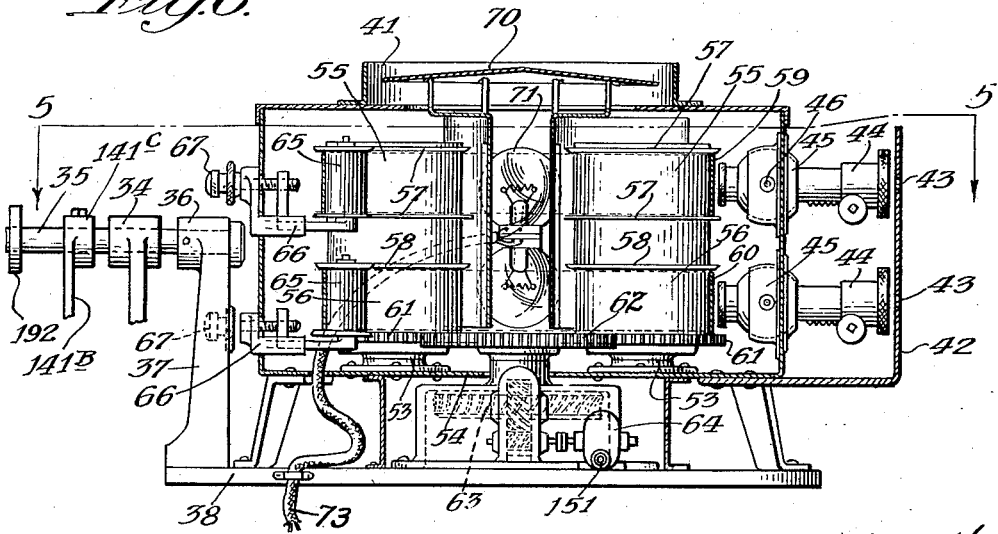
Fig. 6 is a sectional view taken in a vertical plane represented by line 6—6 in Fig. 5 of the drawings.

When valve 153 is opened air is admitted through line 151 and check valve 155 to film motor 64 to cause a travel of the films 59 and 60 in a clockwise motion as viewed in Fig. 5. The student also holds the left pedal 233 in the same position until obtaining the degree of turning desired. Also air is supplied through line 172, check valve 174 to bellows 170, later described.

The stick and rudder pedals are then moved back to neutral position. Valves 153 and 139 are now closed.

In the plane the turn then continues. In the trainer the effect produced is the same. To show how to maintain the correct turn after the controls have been restored to neutral, valves 163 and 164 are held in open position by bellows 169 and 170 whereby air is still supplied by way of line 161, check valve 165 and line 151 to the film motor 64. The check valves 173 and 174 hold the pressure for the bellows 169 and 170 to remain extended after the valves 139 and 153 have closed. The bleeders 185 and 186 are closed and also hold the pressure by reason of the cams 189 and 190 holding said bleeders closed until the machine is restored to level condition.

So long as the turn is maintained the orifices 215 and 221 permit a small amount of air to banking motor 141 and to lateral motor 130, to cause the effect of overbanking and of nosing down in a turn. These must be counteracted by the student as he observes the banking is increasing and the nose is going down in the turn. He counteracts it by pressing the stick a little to the right and maintaining a little back pressure on it at the same time, the same as in a plane.

To effect a right turn the student will press the stick 115 to the right to effect opening of valve 143. At the same time he presses the right rudder pedal 233 to open the valve 154.

When valve 143 is opened air is admitted through line 142 and check valve 144 to banking motor 141. This motor causes platform 38 and projector 39 to tilt about the axis of the shaft 35 (see Figs. 3 and 9). This effects a tilting of views on the forward and side screens to give the impression of banking to the right. The student holds the stick 115 in the same position until the bank increases to the desired angle for the radius of turn to be made. Also air is supplied through line 177, check valve 179 to bellows 175, later described.

When valve 154 is opened air is admitted through line 152 and check valve 156 to film motor 64 to cause a travel of the films 59 and 60 in a counter-clockwise motion as viewed in Fig. 5. The student also holds the right pedal 233 in the same position until obtaining the degree of turning desired. Also air is supplied through line 178, check valve 180 to bellows 176, later described.

The stick and rudder pedals are then moved back to neutral position. Valves 143 and 154 are now closed.

In the plane the turn then continues. In the trainer the effect produced is the same. To show how to maintain the correct turn after the controls have been restored to neutral, valves 166 and 167 are held in open position by the bellows 175 and 176 whereby air is still supplied by way of line 162, check valve 168 and line 162 to the film motor 64. The check valves 179 and 180 hold the pressure for the bellows 175 and 176 to remain extended after the valves 143 and 154 have closed. The bleeders 187 and 188 are closed and also hold the pressure by reason of the cams 191 and 192 holding said bleeders closed until the machine is restored to level condition.

So long as the turn is maintained the orifices 215 and 220 permit a small amount of air to banking motor 141 and to lateral motor 130, to cause the effect of overbanking and of nosing down in a turn. These must be counteracted by the student as he observes the banking is increasing and the nose is going down in the turn. He counteracts it by pressing the stick a little to the left and maintaining a little back pressure on it at the same time, the same as in a plane.

Having completed the desired degree of turn, such as for example, a ninety degree turn or a hundred and eighty degree turn, as hereinbefore described, the student oppositely moves the controls to bring the plane to level and to stop the turning. In the trainer this is carried out by the students' moving the controls in the same manner and causing the projector and its projected images to return to normal position. Also when desiring to teach the effect of climbing or gliding turns the student is taught, while producing the turn, to also apply pressure forwardly or rearwardly on the stick to simultaneously create the desired climbing or gliding turn.

In practice in a plane the movements of the stick and rudder pedals are made smoothly and slowly, not violently and suddenly. This latter is known as over-control. If the student moves the controls, either the stick or the rudder pedals, too rapidly, the result may be a skid or slip. The same effect is shown in the trainer by way of signals. These signals, as shown in Fig. 9, are designed to indicate the degree of error, including an audible signal at the greatest degree of error.

In the case of producing a skid the bellows 157 or 158, depending on whether the skid is to the left or to the right, respectively, will move the switch lever 159 or 160 to successively close circuits to said signals, as is obvious from Fig. 9.

In the event of causing a slip the bellows 145 or 146, depending on whether the slip is to the left or to the right, respectively, will move switch lever 147 or 148 to close circuits to the signals 149 or 150, as shown in Fig. 9.

Thus when the student receives such signals he should immediately correct the condition by moving the controls oppositely to the movement thereof causing the error.

In the trainer of the present invention the student is taught how to secure the effect of losing excessive altitude while coming in for a landing along a given path, such as a runway. One way is to produce the effect of lengthening the flight path by S turning, that is, by alternate right and left turnings prior to landing. Another method is to lose altitude by slipping. The latter effect is shown in the trainer of this invention by moving the stick to right or left but without turning the rudder, and this produces the effect of slipping whereby altitude is lost more rapidly. Then when the trainer shows sufficiently low altitude the student then moves the stick to produce the effect of normal gliding position.

For the purpose of teaching how to allow for the wind effect or drift caused by wind from any direction, such as a head wind, tail wind, side wind, or any combination or resultant of them, the trainer is provided with a series of hand operated valves 194, 237, 238 and 239, valve 194 being in line 193 leading to one side of film motor 64 and hand valve 237 being in a line 240 running from main line 101 to the other side of the film motor 64. Valve 239 is in line 196, on the inlet side of a check valve 242 in said line, running to forward motion motor 49, and valve 238 is in line 241 running from line 204 (see Fig. 10) to line 196 (see Fig. 9).

These valves may be set by the instructor to produce a given wind effect to be accounted for by the student, especially when landing. For example when accounting for a head wind the valve 239 will be set at a given restricted opening by the instructor. This will cause the forward motion motor 49 to operate more slowly and give the same impression of a head wind in actual flight. The student must then learn to operate the controls to compensate for such effect.

In the case of producing the effect of a tail wind the instructor sets the valve 238 to a given opening. This will cause the forward motion motor 49 to operate more rapidly and give the same impression of a tail wind in actual flight. The student must then learn the effect of more rapidly decreasing his excessive altitude and thus approach the end of the runway at the correct height.

When having the effect of a cross wind, either right or left, the instructor adjusts valve 194 or 237 to cause the film motor 64 to move the films to the right or to the left as the case may be. The student then learns to compensate for this drift by a movement of the rudder, or stick, or both, as in actual flight.

In the event of a diagonal wind effect the instructor will adjust a couple of these valves proportionate to the direction and velocity of the wind effect intended to be produced. The student will move his controls to compensate for such effect.

It will be understood that all air lines or ducts are flexible, such as hoses, to be movable with the parts to which they are connected when such parts are moved.

While I have herein described and upon the drawings shown an illustrative embodiment of the invention, it is to be understood that the invention is not limited thereto but comprehends other constructions, details, arrangements of parts, features, and the like without departing from the spirit of the invention.

Having thus disclosed the invention, I claim:

I claim:

1. In an airplane pilot trainer having mechanism simulating that of an airplane and including simulated airplane controls; a screen located spacedly relative to the mechanism where views projected thereon may be seen by the student while operating the controls, a projector located to project views on said screen, a support for said projector and having pivotal means for tiltably supporting said support and said projector about an axis parallel to said screen, lens units carried by said projector and having means for moving said lens units toward and from each other, means connected to said controls and to said moving means for said lens units for said moving of said lens units, and means connected to said controls and to said pivotal means for said projector for tilting said projector about said axis.

2. In an airplane pilot trainer having mechanism simulating that of an airplane and including simulated airplane controls; a screen located spacedly relative to the mechanism where views projected thereon may be seen by the student while operating the controls, a projector located to project views on said screen, a support for said projector and having pivotal means for tiltably supporting said support and said projector about an axis parallel to said screen, lens units carried by said projector and having means for moving said lens units toward and from each other, means connected to said controls and to said moving means for said lens units for said moving of said lens units, a source of light carried by said projector, a scene objective carried by said projector between said source of light and said lens units, means for movably supporting said objective, means connected to said latter supporting means and to said controls for moving said objective between said source of light and said lens units.

3. In an airplane pilot trainer having mechanism simulating that of an airplane and including simulated airplane controls; a screen located spacedly relative to the mechanism where views projected thereon may be seen by the student while operating the controls, a projector located to project views on said screen, means connected to said controls and said projector for moving said projector for selectively projecting scenes on the screen in simulation of views seen in actual flight, said controls including manual and pedal members, valves operable by said members, a source of fluid under pressure, ducts connected to said source and to said valves, said valves being connected to said projector moving means, and means associated with said manual and pedal members to afford given resistance to freedom of action thereof under given conditions, said projector moving means having cams, and said ducts having other valves operatively connected to said cams to be operated by said cams when said cams are moved by said projector moving means in accordance with the movement of the projector under given conditions.

CORNELIUS C. McCARTHY.